(12) United States Patent
Kobayashi et al.

(10) Patent No.: US 9,884,392 B2
(45) Date of Patent: Feb. 6, 2018

(54) LASER WELDING APPARATUS AND LASER WELDING METHOD

(71) Applicant: TOYOTA JIDOSHA KABUSHIKI KAISHA, Toyota-shi (JP)

(72) Inventors: Hiroomi Kobayashi, Okazaki (JP); Keisuke Uchida, Nagoya (JP); Ryo Watanabe, Toyota (JP); Yuto Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 360 days.

(21) Appl. No.: 14/885,145

(22) Filed: Oct. 16, 2015

(65) Prior Publication Data
US 2016/0136755 A1    May 19, 2016

(30) Foreign Application Priority Data
Nov. 14, 2014   (JP) .................. 2014-231525

(51) Int. Cl.
*B23K 26/21* (2014.01)
*B23K 26/03* (2006.01)
*B23K 26/14* (2014.01)
*B23K 26/244* (2014.01)

(52) U.S. Cl.
CPC ........ *B23K 26/032* (2013.01); *B23K 26/1437* (2015.10); *B23K 26/244* (2015.10)

(58) Field of Classification Search
CPC ......... B23K 26/03; B23K 26/12; B23K 26/21
USPC ................... 219/121.62–121.64, 121.84
See application file for complete search history.

(56) References Cited

U.S. PATENT DOCUMENTS 5,961,859 A      10/1999   Chou et al.
2004/0247522 A1*  12/2004  Mills .............. B01J 19/088
                                              423/648.1

FOREIGN PATENT DOCUMENTS

| JP | 6-262377   |   | 9/1994  |
|----|------------|---|---------|
| JP | 11-221686  | A | 8/1999  |
| JP | 2001-71164 | A | 3/2001  |
| JP | 2001-170787| A | 6/2001  |
| JP | 2001-314992|   | 11/2001 |
| JP | 2003-88969 | A | 3/2003  |
| JP | 2004-130360|   | 4/2004  |

* cited by examiner

*Primary Examiner* — Samuel M Heinrich
(74) *Attorney, Agent, or Firm* — Oblon, McClelland, Maier & Neustadt, L.L.P.

(57) ABSTRACT

Provided is a laser welding apparatus that performs welding by irradiating a laser beam onto a welded part, the laser welding apparatus including: a shielding gas supply unit that supplies a shielding gas to the welded part; a gas feed rate controlling unit that controls a flow rate of the shielding gas; a light intensity measurement unit that measures a light intensity of plasma light emitted from the welded part; and a rate-of-change calculation unit that calculates a rate of change of the light intensity measured by the light intensity measurement unit. The gas feed rate controlling unit controls, according to the calculated rate of change of the light intensity, the flow rate of the shielding gas supplied to the welded part.

6 Claims, 9 Drawing Sheets

LASER WELDING APPARATUS AND LASER WELDING METHOD

INCORPORATION BY REFERENCE

This application is based upon and claims the benefit of priority from Japanese patent application No. 2014-231525, filed on Nov. 14, 2014, the disclosure of which is incorporated herein in its entirety by reference.

BACKGROUND OF THE INVENTION

1. Field of the Invention

The present invention relates to a laser welding apparatus and a laser welding method, and more particularly, to a laser welding apparatus and a laser welding method which perform welding while supplying a shielding gas to a welded part.

2. Description of Related Art

Laser welding is a welding method in which welding is performed with a laser beam as a source of heat. In a case where two metal plates are stacked and welded, the two metal plates are superimposed one on the other and are then scanned with a laser beam. Accordingly, the part irradiated with the laser beam is heated, so that the two metal plates are melted. Melts of the two metal plates are mixed and then solidified, thereby joining the two metal plates in a stacked state. At this time, the cross-sectional shape of a bead to be formed varies depending on the shielding gas supplied to the welded part.

Japanese Unexamined Patent Application Publication No. 2004-130360 discloses a technique relating to a laser welding apparatus which uses a mixed gas of inert gas and oxygen gas as a shielding gas.

SUMMARY OF THE INVENTION

As described in the "Description of Related Art" section, in the laser welding apparatus that performs welding by irradiating a laser beam onto the welded part while supplying a shielding gas to the welded part, the cross-sectional shape of a bead to be formed varies depending on the shielding gas supplied to the welded part. For example, when an inert gas is used as the shielding gas, the bead has a wine-cup shape in cross-section (see FIG. 2). When a mixed gas of inert gas and oxygen gas is used as the shielding gas, the bead has a tumbler shape in cross-section (see FIG. 3).

In the case of performing welding while supplying the shielding gas to the welded part as described above, the cross-sectional shape of a bead to be formed can be adjusted by controlling the type of the shielding gas or the feed rate thereof. However, if the feed rate of the shielding gas varies during welding, a variation in the cross-sectional shape of a bead to be formed at the welded part occurs, which causes a problem that a welding failure occurs.

In view of the above-mentioned problem, an object of the present invention is to provide a laser welding apparatus and a laser welding method which are capable of suppressing the occurrence of a variation in the cross-sectional shape of a bead to be formed.

A first exemplary aspect of the present invention is a laser welding apparatus that performs welding by irradiating a laser beam onto a welded part, the laser welding apparatus including: a shielding gas supply unit that supplies a shielding gas to the welded part; a gas feed rate controlling unit that controls a flow rate of the shielding gas supplied from the shielding gas supply unit; a light intensity measurement unit that measures a light intensity of plasma light emitted from the welded part; and a rate-of-change calculation unit that calculates a rate of change of the light intensity measured by the light intensity measurement unit. The gas feed rate controlling unit controls, according to the calculated rate of change of the light intensity, the flow rate of the shielding gas supplied to the welded part.

A second exemplary aspect of the present invention is a laser welding method that performs welding by irradiating a laser beam onto a welded part while supplying a shielding gas to the welded part, the laser welding method including: measuring a light intensity of plasma light emitted from the welded part; calculating a rate of change of the measured light intensity; and controlling, according to the calculated rate of change of the light intensity, a flow rate of the shielding gas supplied to the welded part.

In the laser welding apparatus and the laser welding method according to exemplary aspects of the present invention, the light intensity of plasma light emitted from the welded part is measured; the rate of change of the measured light intensity is calculated; and the flow rate of the shielding gas supplied to the welded part is controlled according to the rate of change of the light intensity. Accordingly, a feedback control can be performed so that the shielding gas can be supplied at an appropriate feed rate, while the supply state of the shielding gas is monitored in real time. Consequently, a variation in the feed rate of the shielding gas can be suppressed, and the occurrence of a variation in the cross-sectional shape of a bead to be formed at the welded part can be suppressed.

According to the present invention, it is possible to provide a welding apparatus and a laser welding method which are capable of suppressing the occurrence of a variation in the cross-sectional shape of a bead to be formed.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments of the present invention will be described below with reference to the drawings.

Figure 1:
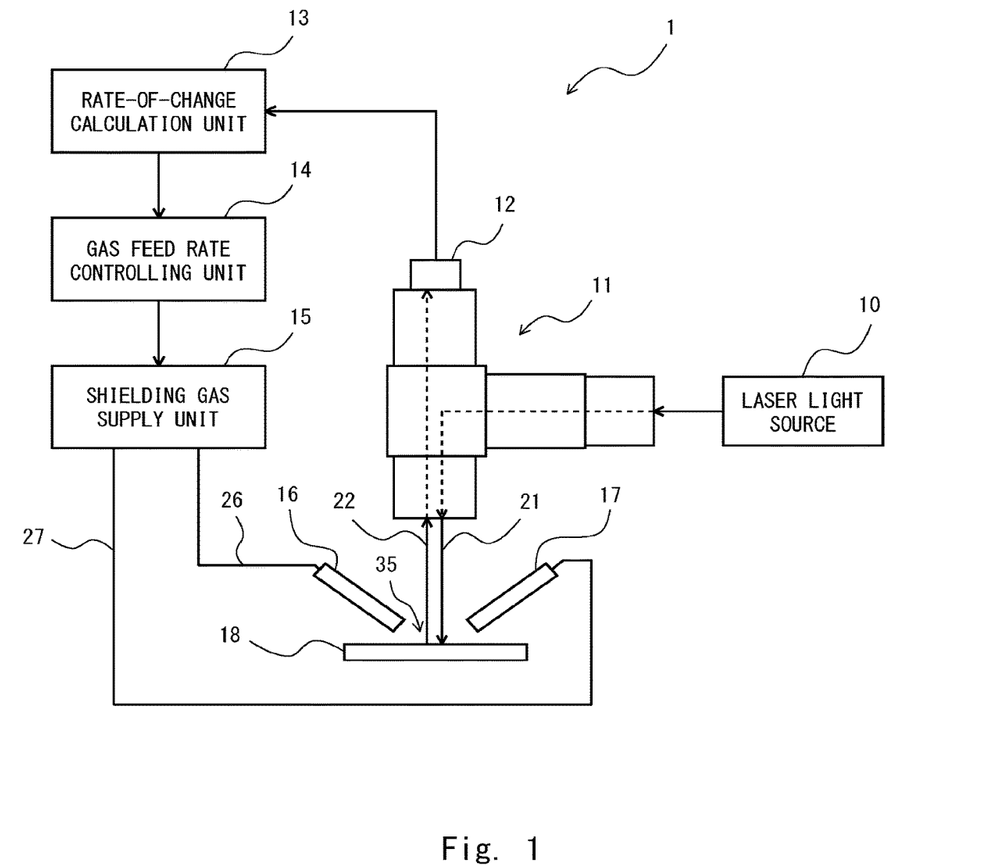
FIG. 1 is a diagram showing a laser welding apparatus according to an exemplary embodiment.

FIG. 1 shows a laser welding apparatus 1 according to an exemplary embodiment of the present invention. As shown in FIG. 1, the laser welding apparatus 1 includes a laser light source 10, a main body portion 11, a light intensity measurement unit 12, a rate-of-change calculation unit 13, a gas feed rate controlling unit 14, a shielding gas supply unit 15, and nozzles 16 and 17.

The laser light source 10 is a device that generates a laser beam. For example, a carbon dioxide gas laser or a YAG (Yttrium Aluminum Garnet) laser can be used as a laser beam. The laser beam generated by the laser light source 10 passes through the main body portion 11 and is guided to the surface of a welded member 18.

Figure 2:
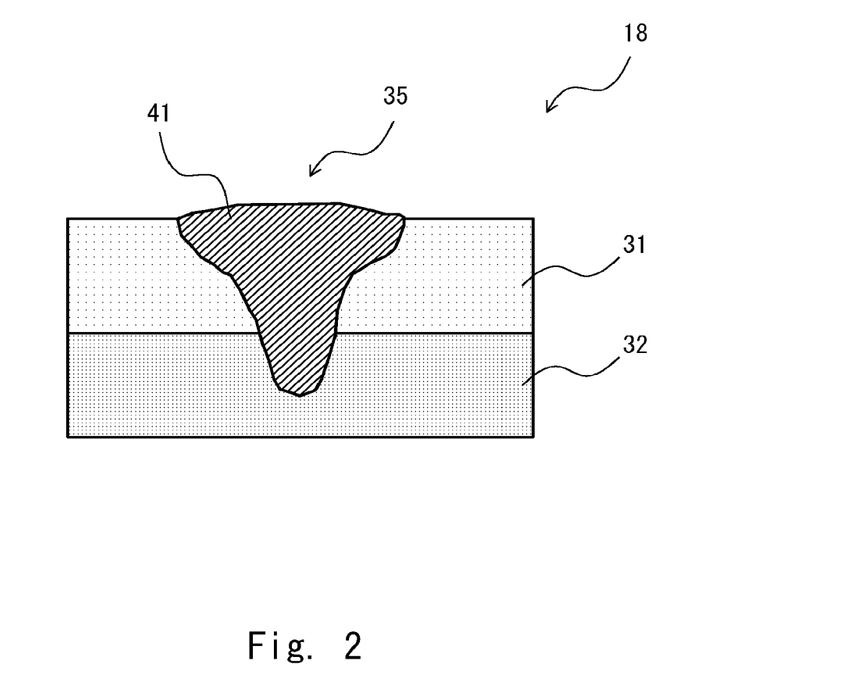
FIG. 2 is a sectional view showing the shape (wine-cup shape) of a bead to be formed at a welded part.
Figure 3:
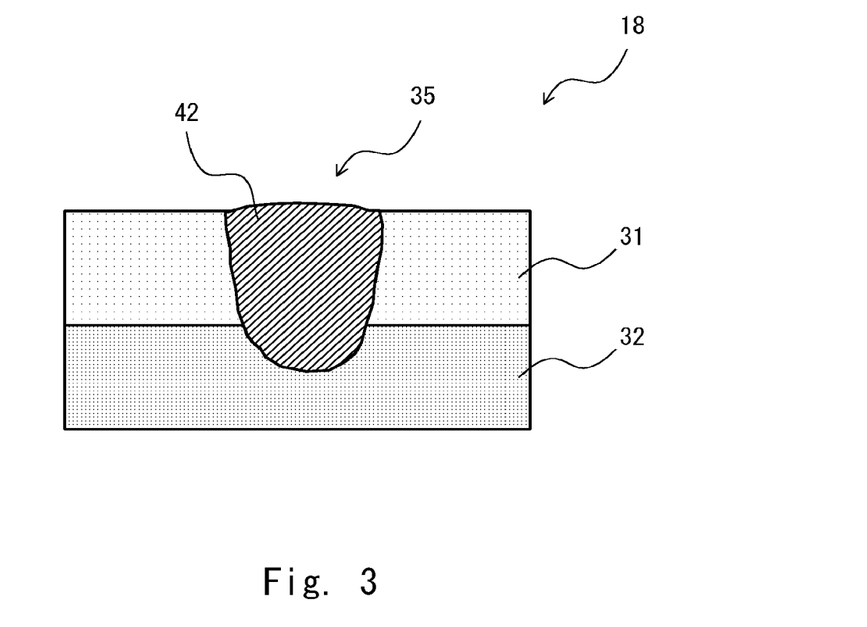
FIG. 3 is a sectional view showing the shape (tumbler shape) of a bead to be formed at a welded part.

When a laser beam 21 is irradiated on the surface of the welded member 18, the welded member 18 is welded. For example, as shown in FIGS. 2 and 3, the welded member 18 is a member formed of two metal plates 31 and 32 that are stacked one on the other. When the laser beam is irradiated on a welded part 35 of the two stacked metal plates 31 and 32, the laser beam penetrates through the upper metal plate 31 and the top surface of the lower metal plate 32 is melted, so that a molten pool (corresponding to the shape of each of beads 41 and 42 to be formed thereafter), which is a mixture of melts of the two metal plates 31 and 32, is generated. After that, the molten pool is cooled and solidified, thereby joining the two metal plates 31 and 32 together. At this time, the beads 41 and 42 are each formed at the welded part 35. During welding, plasma light 22 is emitted from the welded part 35 (molten pool).

In the case of welding the two metal plates 31 and 32, the surface of the welded member 18 is scanned with the laser beam 21. For example, in a structure in which the main body portion 11 (laser beam 21) is fixed and a stage (not shown) on which the welded member 18 is placed is movable, the surface of the welded member 18 can be scanned with the laser beam 21. Alternatively, in a structure in which the stage (not shown) on which the welded member 18 is placed is fixed and the main body portion 11 (laser beam 21) is movable, the surface of the welded member 18 can be scanned with the laser beam 21. Note that both the main body portion 11 (laser beam 21) and the welded member 18 may be movably disposed.

The light intensity measurement unit 12 shown in FIG. 1 measures the light intensity of the plasma light 22 emitted from the welded part 35. For example, a photodiode can be used as the light intensity measurement unit 12. The light intensity of the plasma light 22 may be observed with a CCD (Charge Coupled Device) image sensor. The light intensity measured by the light intensity measurement unit 12 is supplied to the rate-of-change calculation unit 13.

The rate-of-change calculation unit 13 calculates a rate of change of the light intensity measured by the light intensity measurement unit 12. For example, the rate-of-change calculation unit 13 time-differentiates the time function of the light intensity (see the upper figure of FIG. 7), thereby making it possible to calculate the rate of change of the light intensity (see the lower figure of FIG. 7).

The gas feed rate controlling unit 14 controls the shielding gas supply unit 15. The shielding gas supply unit 15 supplies a shielding gas to the welded part 35 of the welded member 18. For example, an inert gas, such as nitrogen gas, argon gas, or helium gas, can be used as the shielding gas. The use of the inert gas as the shielding gas can suppress the oxidation of the welded part (bead). A mixed gas of inert gas and oxygen gas may also be used as the shielding gas.

The shielding gas supply unit 15 supplies an inert gas to the nozzle 16 through a pipe 26. Further, the shielding gas supply unit 15 supplies an oxygen gas to the nozzle 17 through a pipe 27. The shielding gas supply unit 15 adjusts the flow rate of the inert gas supplied to the nozzle 16 and the flow rate of the oxygen gas supplied to the nozzle 17, thereby making it possible to adjust the ratio between the inert gas and the oxygen gas which are included in the shielding gas.

For example, as shown in FIG. 2, when the bead 41 has a wine-cup shape in cross-section, only the inert gas (or the gas may include a small amount of oxygen gas) is used as the shielding gas. In this case, the bead 41 can be prevented from being oxidized. Furthermore, the width of the surface of the molten pool (corresponding to the bead 41) can be increased. Accordingly, when a welding wire is used, an appropriate range for the position where the welding wire is provided can be increased.

For example, when the bead 42 has a tubular shape in cross-section as shown in FIG. 3, a mixed gas of inert gas and oxygen gas is used as the shielding gas (for example, 20% by volume of oxygen gas is mixed with the inert gas). In this case, the width of a portion where the metal plate 31 and the metal plate 32 are joined together can be increased and the joint strength can be increased. Furthermore, the difference in shrinkage between that of the metal plate 31 and that of the metal plate 32 can be reduced, resulting in a reduction in welding distortion.

Figure 4:
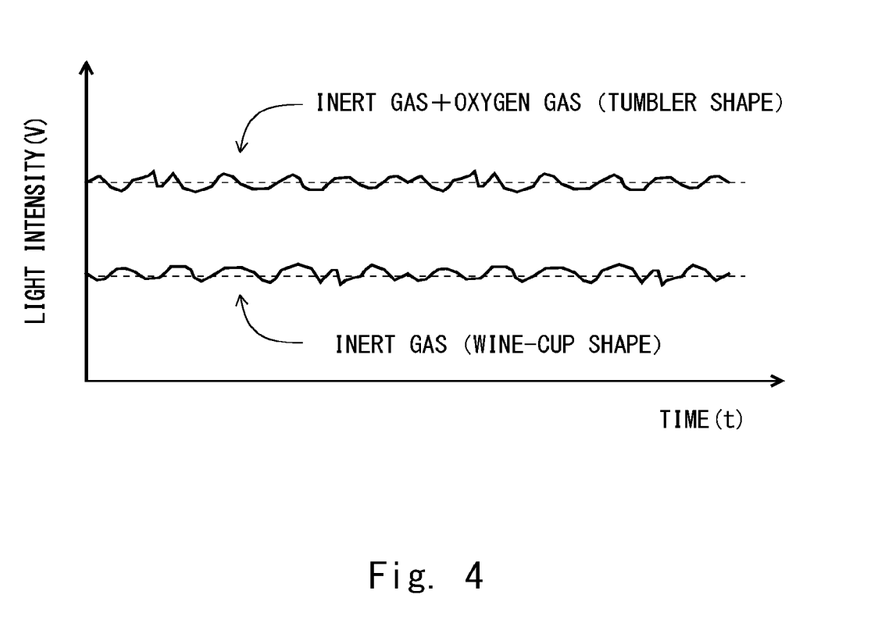
FIG. 4 is a graph showing a light intensity of plasma light emitted from the welded part.

FIG. 4 is a graph showing the light intensity of plasma light emitted from the welded part, and showing the time function of the light intensity. As shown in FIG. 4, when only the inert gas is used as the shielding gas (when the bead has a wine-cup shape in cross-section), the light intensity is lower than that in the case where the mixed gas of inert gas and oxygen gas is used as the shielding gas (when the bead has a tumbler shape in cross-section). In the case shown in FIG. 4, the light intensity is stable when only the inert gas is used as the shielding gas, as well as when the mixed gas of inert gas and oxygen gas is used as the shielding gas. Therefore, the cross-sectional shape of each of the beads to be formed is stable.

Figure 5:
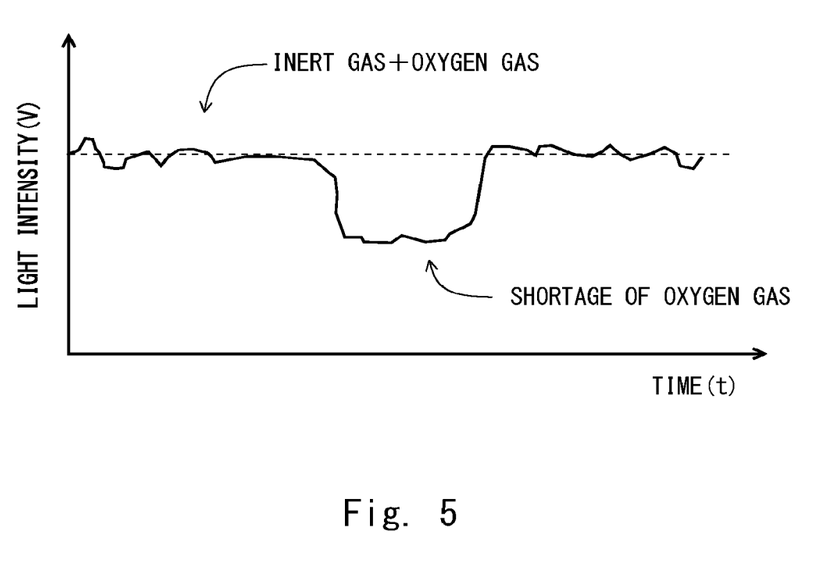
FIG. 5 is a graph showing a light intensity of plasma light emitted from the welded part.

On the other hand, as shown in FIG. 5, if the oxygen gas is insufficient when welding is performed using the mixed gas of inert gas and oxygen gas as the shielding gas, the light intensity of the plasma light emitted from the welded part 35 decreases. At this time, the cross-sectional shape of the bead formed at the welded part 35 changes from the tubular shape to the wine-cup shape. In this manner, when the feed rate of the shielding gas varies, the cross-sectional shape of the bead formed at the welded part 35 varies, which causes a welding failure.

In the laser welding apparatus 1 according to this exemplary embodiment, the above-mentioned problem is solved in the follow manner. That is, the light intensity of the plasma light emitted from the welded part 35 is measured by the light intensity measurement unit 12; the rate of change of the measured light intensity is calculated by the rate-of-change calculation unit 13; and the flow rate of the shielding gas supplied to the welded part 35 is controlled according to the rate of change of the light intensity. A method for controlling the laser welding apparatus 1 according to this exemplary embodiment will be described in detail below.

Figure 6:
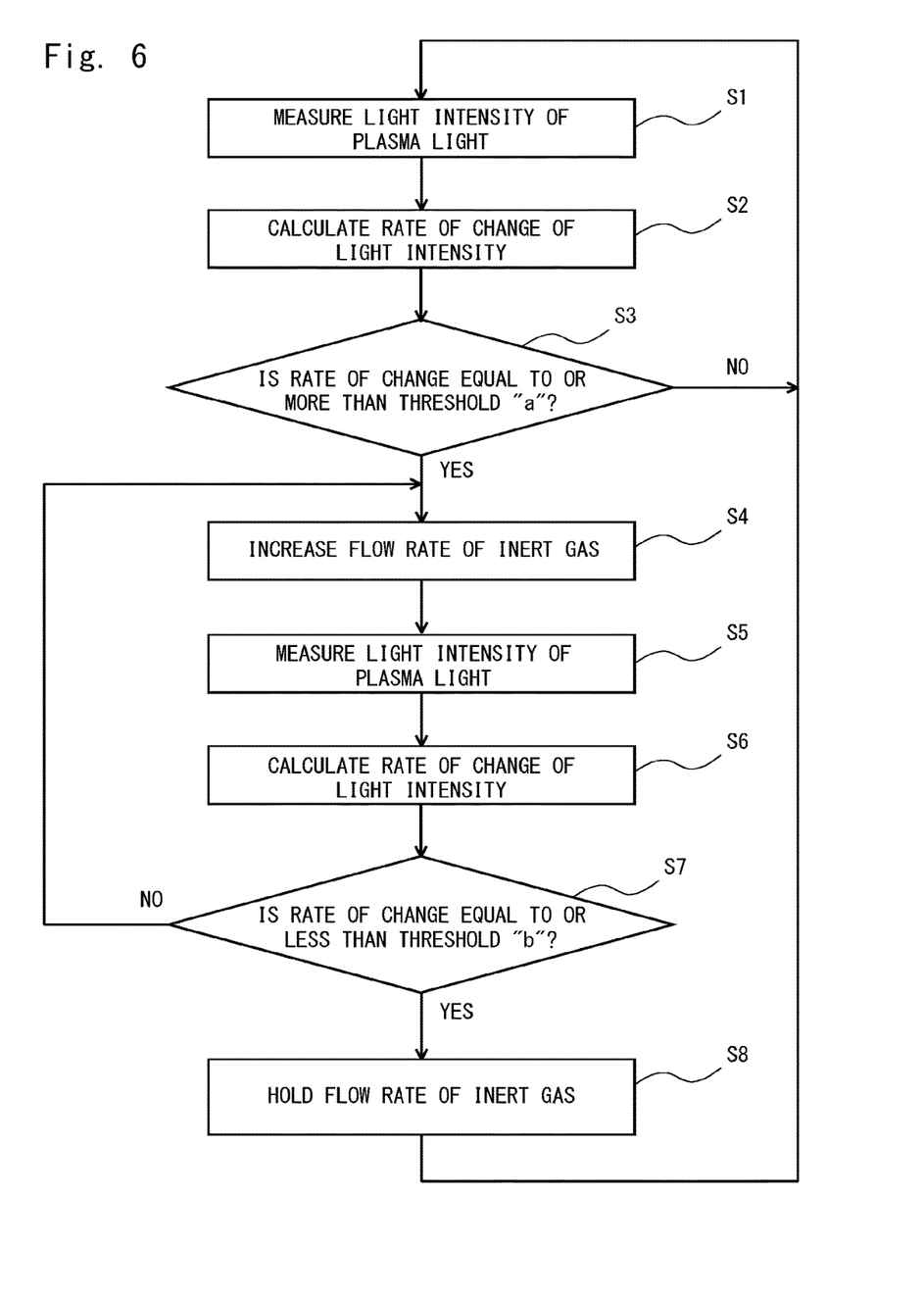
FIG. 6 is a flowchart showing a control flow of the laser welding apparatus according to the exemplary embodiment (when the shape of a bead to be formed is a wine-cup shape)
Figure 7:
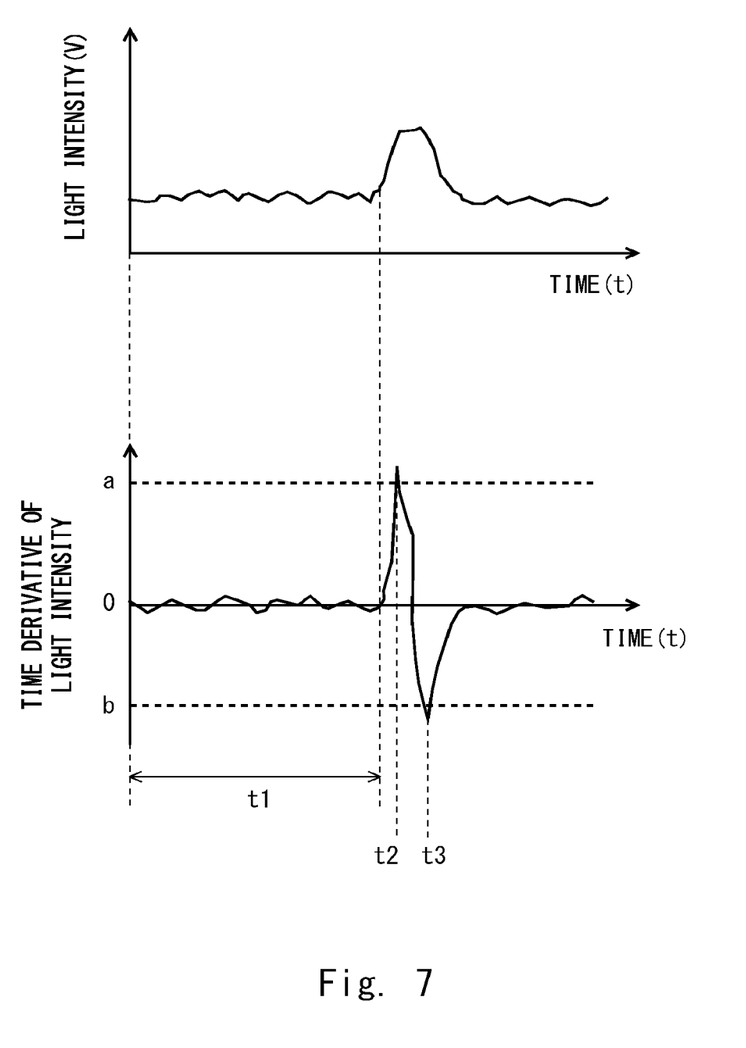
FIG. 7 is a graph showing a light intensity of plasma light emitted from the welded part (as shown in the upper figure), and showing a time derivative of the light intensity (as shown in the lower figure)

First, the case where a bead to be formed has a wine-cup shape in cross-section (see FIG. 2) will be described with reference to the flowchart of FIG. 6 and FIG. 7. In the case where a bead to be formed has a wine-cup shape in cross-section, only the inert gas (or the gas may include a small amount of oxygen gas) is used as the shielding gas. During the period in which welding is performed by scanning the welded part 35 with a laser beam while supplying the shielding gas to the welded part 35, the laser welding apparatus 1 carries out the process shown in FIG. 6.

First, the light intensity measurement unit 12 measures the light intensity of the plasma light 22 emitted from the welded part 35 (step S1). Next, the rate-of-change calculation unit 13 calculates the rate of change of the light intensity measured by the light intensity measurement unit 12 (step S2). For example, the rate-of-change calculation unit 13 calculates the rate of change of the light intensity by time-differentiating the time function of the light intensity (V) shown in the upper figure of FIG. 7.

Next, the gas feed rate controlling unit 14 determines whether the rate of change of the light intensity calculated by the rate-of-change calculation unit 13 is equal to or more than a predetermined threshold "a" (a first threshold: a>0) (step S3). When the rate of change of the light intensity calculated by the rate-of-change calculation unit 13 is less than the threshold "a" (step S3: No), the gas feed rate controlling unit 14 repeats the operation of steps S1 to S3 without changing the feed rate of the shielding gas supplied to the welded part 35. This state (corresponding to an interval t1 shown in FIG. 7) indicates that the shielding gas is stably supplied to the welded part 35 and the cross-sectional shape of a bead to be formed is also stable.

On the other hand, when the rate of change of the light intensity calculated by the rate-of-change calculation unit 13 is equal to or more than the threshold "a" (step S3: Yes), the gas feed rate controlling unit 14 controls the shielding gas supply unit 15 to increase the flow rate of the inert gas supplied from the nozzle 16 (step S4). Specifically, at a timing t2 shown in FIG. 7, the rate of change of the light intensity is equal to or more than the threshold "a", which indicates that the light intensity of the plasma light 22 emitted from the welded part 35 has greatly increased. This is assumed to be due to a mixture (oversupply) of oxygen gas, or a deficiency of the inert gas. Accordingly, the gas feed rate controlling unit 14 controls the shielding gas supply unit 15 to increase the flow rate of the inert gas supplied from the nozzle 16. By increasing the flow rate of the inert gas in this manner, a bead having a wine-cup shape in cross-section can be formed. This makes it possible to suppress a reduction in the width of the surface of the molten pool and an excessive increase in the width of the portion where the metal plates are joined together.

After that, the light intensity measurement unit 12 measures again the light intensity of the plasma light 22 emitted from the welded part 35 (step S5). Next, the rate-of-change calculation unit 13 calculates the rate of change of the light intensity measured by the light intensity measurement unit 12 (step S6).

Then, the gas feed rate controlling unit 14 determines whether the rate of change of the light intensity calculated by the rate-of-change calculation unit 13 is equal to or less than a predetermined threshold "b" (a second threshold: b<0) (step S7). When the rate of change of the light intensity calculated by the rate-of-change calculation unit 13 is larger than the threshold "b" (step S7: No), the gas feed rate controlling unit 14 increases the flow rate of the inert gas supplied to the welded part 35 (step S4), and repeats the operation of steps S5 to S7. This situation indicates that the flow rate of the inert gas is still insufficient, even though the flow rate of the inert gas is increased.

On the other hand, when the rate of change of the light intensity calculated by the rate-of-change calculation unit 13 is equal to or less than the threshold b (step S7: Yes), the gas feed rate controlling unit 14 maintains the flow rate of the inert gas which is currently supplied from the nozzle 16 (step S8). Specifically, at a timing t3 shown in FIG. 7, when the rate of change of the light intensity is equal to or less than the threshold "b", the flow rate of the inert gas increases and the light intensity of the plasma light 22 decreases. This indicates that the light intensity of the plasma light 22 emitted from the welded part 35 has returned to a steady state. Accordingly, the gas feed rate controlling unit 14 maintains the flow rate of the inert gas at this timing. Thus, the supply state of the shielding gas can be maintained in an appropriate state.

After that, by repeating the operation of steps S1 to S8, a feedback control can be performed so that the shielding gas can be supplied at an appropriate feed rate, while the supply state of the shielding gas is monitored in real time.

If the rate of change of the light intensity does not become equal to or less than the threshold "b" even after repeating the operation of steps S4 to S7, it is considered that the laser welding apparatus is out of order. In this case, the laser welding operation is stopped.

The thresholds "a" and "b" can be obtained in advance by, for example, the following method. First, a Fourier transform is performed on the waveform of the light intensity of plasma light from a non-defective product, to thereby specify high-frequency components, i.e., noise. After that, noise components are removed by a low-pass filter. Then, a function (dV/dt) is obtained by time-differentiating the waveform of the light intensity of the plasma light, which has passed through the low-pass filter, and an average value $\mu$ and a standard deviation $\sigma$ of the weld time of the function (dV/dt) are obtained. For example, in a case where the thresholds are set using a value that is three times the standard deviation $\sigma$, the threshold "a" is represented by $\mu+3\sigma$ and the threshold b is represented by $\mu-3\sigma$. The average value $\mu$ is an average value of the values obtained by time-differentiating the waveform of the light intensity, and thus the average value is a value close to 0. In other to increase the sensitivity to a change in the light intensity of the plasma light, the thresholds "a" and "b" may be set using a value that is twice the standard deviation $\sigma$. On the contrary, in order to reduce the sensitivity to a change in the light intensity of the plasma light, the thresholds "a" and "b" may be set using a value that is four times the standard deviation $\sigma$.

The method of setting the thresholds "a" and "b" has been described above only as an example. The thresholds "a" and "b" may be set by methods other than the above-described method in the laser welding apparatus according to this exemplary embodiment.

Figure 8:
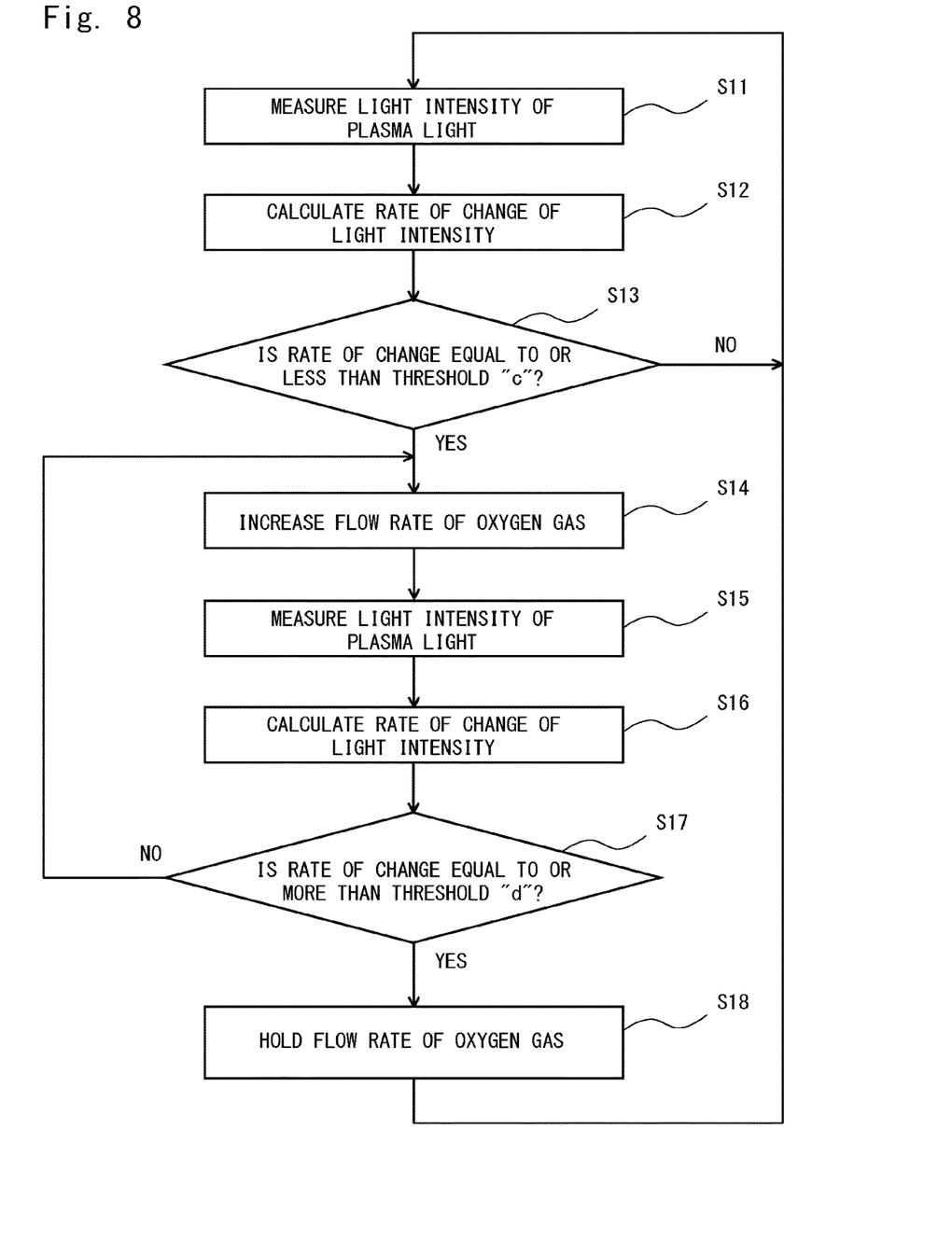
FIG. 8 is a flowchart showing a control flow of the laser welding apparatus according to the exemplary embodiment (when the shape of a bead to be formed is a tumbler shape)
Figure 9:
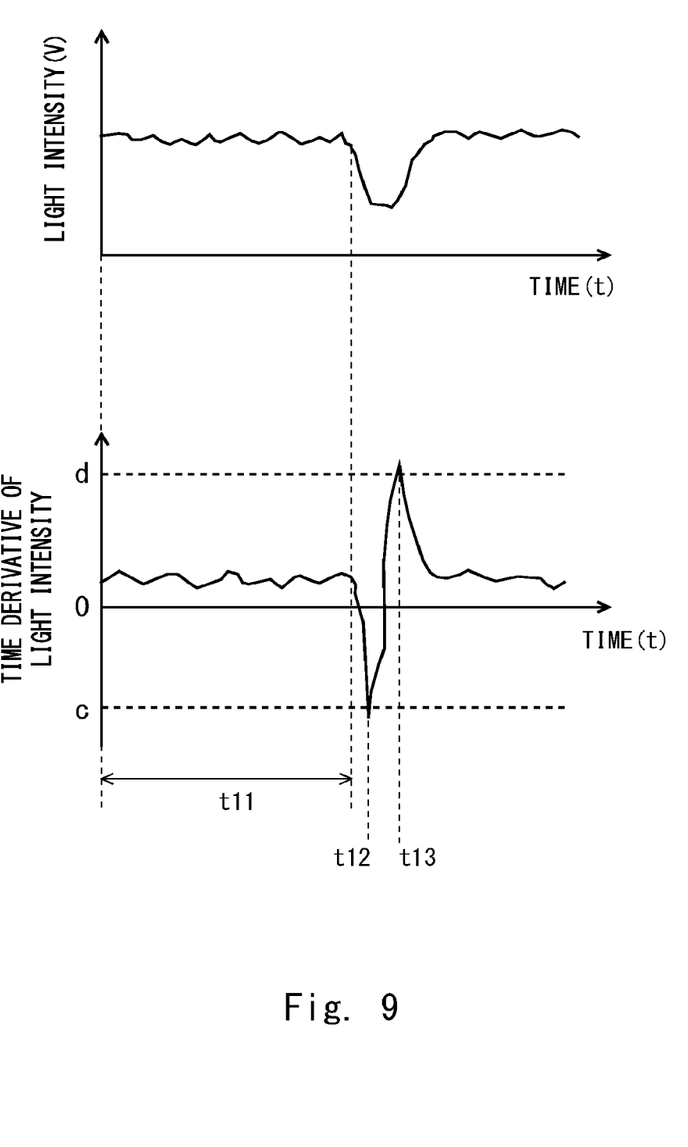
FIG. 9 is a graph showing a light intensity of plasma light emitted from the welded part (as shown in the upper figure), and showing a time derivative of the light intensity (as shown in the lower figure).

Next, the case where a bead to be formed has a tumbler shape in cross-section (see FIG. 3) will be described with reference to the flowchart of FIG. 8 and FIG. 9. When the bead has a tumbler shape in cross-section, a mixed gas of inert gas and oxygen gas is used as the shielding gas. During the period in which welding is performed by scanning the welded part 35 with a laser beam while the shielding gas is supplied to the welded part 35, the laser welding apparatus 1 carries out the process shown in FIG. 8.

First, the light intensity measurement unit 12 measures the light intensity of the plasma light 22 emitted from the welded part 35 (step S11). Next, the rate-of-change calculation unit 13 calculates the rate of change of the light intensity measured by the light intensity measurement unit 12 (step S12). For example, the rate-of-change calculation unit 13 calculates the rate of change of the light intensity by time-differentiating the time function of the light intensity (V) shown in the upper figure of FIG. 9.

Next, the gas feed rate controlling unit 14 determines whether the rate of change of the light intensity calculated by the rate-of-change calculation unit 13 is equal to or less than a predetermined threshold "c" (a third threshold: c<0) (step S13). When the rate of change of the light intensity calculated by the rate-of-change calculation unit 13 is larger than the threshold "c" (step S13: No), the gas feed rate controlling unit 14 repeats the operation of steps S11 to S13 without changing the feed rate of the shielding gas supplied to the welded part 35. This situation indicates that the shielding gas is stably supplied to the welded part 35 (corresponding to an interval t11 shown in FIG. 9) and the cross-sectional shape of a bead to be formed is also stable.

On the other hand, when the rate of change of the light intensity calculated by the rate-of-change calculation unit 13 is equal to or less than the threshold "c" (step S13: Yes), the gas feed rate controlling unit 14 controls the shielding gas supply unit 15 to increase the flow rate of the oxygen gas supplied from the nozzle 16 (step S 14). Specifically, at a timing t12 shown in FIG. 9, the rate of change of the light intensity is equal to or less than the threshold "c", which indicates that the light intensity of the plasma light 22 emitted from the welded part 35 has greatly decreased. This is assumed to be due to a deficiency of the oxygen gas (i.e., a decrease in the percentage by volume of the oxygen gas with respect to the inert gas). Accordingly, the gas feed rate controlling unit 14 controls the shielding gas supply unit 15 to increase the flow rate of the oxygen gas supplied from the nozzle 17. By increasing the flow rate of the oxygen gas in this manner, a bead having a tumbler shape in cross-section can be formed. This makes it possible to suppress a reduction in the width of the surface of the molten pool and an excessive reduction in the width of the portion where the metal plates are joined together.

After that, the light intensity measurement unit 12 measures again the light intensity of the plasma light 22 emitted from the welded part 35 (step S15). Next, the rate-of-change calculation unit 13 calculates the rate of change of the light intensity measured by the light intensity measurement unit 12 (step S16).

Then, the gas feed rate controlling unit 14 determines whether the rate of change of the light intensity calculated by the rate-of-change calculation unit 13 is equal to or more than a predetermined threshold "d" (a fourth threshold: d>0) (step S17). When the rate of change of the light intensity calculated by the rate-of-change calculation unit 13 is less than the threshold "d" (step S17: No), the gas feed rate controlling unit 14 increases the flow rate of the oxygen gas supplied to the welded part 35 (step S14), and repeats the operation of steps S15 to S17. This situation indicates that the flow rate of the oxygen gas is still insufficient, even though the flow rate of the oxygen gas is increased.

On the other hand, when the rate of change of the light intensity calculated by the rate-of-change calculation unit 13 is equal to or more than the threshold "d" (step S17: Yes), the gas feed rate controlling unit 14 maintains the flow rate of the oxygen gas which is currently supplied from the nozzle 17 (step S18). Specifically, at a timing t13 shown in FIG. 9, when the rate of change of the light intensity is equal to or more than the threshold "d", the flow rate of the oxygen gas increases and the light intensity of the plasma light 22 increases. This indicates that the light intensity of the plasma light 22 emitted from the welded part 35 has returned to a steady state. Accordingly, the gas feed rate controlling unit 14 maintains the flow rate of the oxygen gas at this timing. Thus, the supply state of the shielding gas can be maintained in an appropriate state.

After that, by repeating the operation of steps S11 to S18, a feedback control can be performed so that the shielding gas can be supplied at an appropriate feed rate, while the supply state of the shielding gas is monitored in real time.

If the rate of change of the light intensity does not become equal to or more than the threshold "d" even after repeating the operation of steps S14 to S17, it is considered that the laser welding apparatus is out of order. In this case, the laser welding operation is stopped.

The thresholds "c" and "d" can be set by a method similar to the method of setting the thresholds "a" and "b" described above. For example, in a case where the thresholds are set using a value that is three times the standard deviation a, the threshold "c" is represented by $\mu-3\sigma$ and the threshold "d" is represented by $\mu+3\sigma$. The method of setting the thresholds "c" and "d" has been described above only as an example. The thresholds "c" and "d" may be set by methods other than the above-described method in the laser welding apparatus according to this exemplary embodiment.

As described in the "Description of Related Art" section, in the laser welding apparatus that performs welding by irradiating a laser beam onto the welded part while supplying a shielding gas to the welded part, the cross-sectional shape of a bead to be formed varies depending on the shielding gas supplied to the welded part. For example, when an inert gas is used as the shielding gas, the bead has a wine-cup shape in cross-section (see FIG. 2). When a mixed gas of inert gas and oxygen gas is used as the shielding gas, the bead has a tumbler shape in cross-section (see FIG. 3).

In the case of performing welding while supplying the shielding gas to the welded part as described above, the cross-sectional shape of a bead to be formed can be adjusted by controlling the type of the shielding gas or the feed rate thereof. However, if the feed rate of the shielding gas varies during welding, a variation in the cross-sectional shape of a bead to be formed at the welded part occurs, which causes a problem that a welding failure occurs.

To solve the above problem, in the laser welding apparatus 1 according to this exemplary embodiment, the light intensity of the plasma light emitted from the welded part 35 is measured by the light intensity measurement unit 12; the rate of change of the measured light intensity is calculated by the rate-of-change calculation unit 13; and the flow rate of the shielding gas supplied to the welded part is controlled according to the rate of change of the light intensity. Accordingly, a feedback control can be performed so that the shielding gas can be supplied at an appropriate feed rate, while the supply state of the shielding gas is monitored in real time. Consequently, a variation in the feed rate of the shielding gas can be suppressed, and the occurrence of a variation in the cross-sectional shape of a bead to be formed at the welded part can be suppressed.

In particular, it is determined whether the feed rate of the shielding gas is appropriate or not by using the rate of change of the light intensity in the laser welding apparatus 1 according to this exemplary embodiment. Therefore, the response speed can be increased during the feedback control. Specifically, in the case of determining whether the feed rate of the shielding gas is appropriate or not by using the light intensity of plasma light, the feed rate of the shielding gas is determined to be inappropriate only after the light intensity decreases. In this case, a welding failure continues for a long time before the light intensity decreases, which leads to deterioration in welding quality. On the other hand, in the case of determining whether the feed rate of the shielding gas is appropriate or not by using the rate of change of the light intensity, a sign of a decrease in the light intensity can be immediately recognized. Accordingly, the feedback control can be performed so that the shielding gas can be supplied at an appropriate feed rate, without the need for waiting for a decrease in the light intensity. Thus, the occurrence of the welding failure can be reduced and the welding quality can be improved.

The invention according to exemplary embodiments of the present invention described above can provide a laser welding apparatus and a laser welding method which are capable of suppressing the occurrence of a variation in the cross-sectional shape of a bead to be formed.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser welding apparatus that performs welding by irradiating a laser beam onto a welded part, the laser welding apparatus comprising:
   a shielding gas supply unit that supplies a shielding gas to the welded part;
   a gas feed rate controlling unit that controls a flow rate of the shielding gas supplied from the shielding gas supply unit;
   a light intensity measurement unit that measures a light intensity of plasma light emitted from the welded part; and
   a rate-of-change calculation unit that calculates a rate of change of the light intensity measured by the light intensity measurement unit,
   wherein the gas feed rate controlling unit controls, according to the calculated rate of change of the light intensity, the flow rate of the shielding gas supplied to the welded part.

2. The laser welding apparatus according to claim 1, wherein when the rate of change of the light intensity is equal to or more than a first threshold (a value greater than zero), the gas feed rate controlling unit increases a flow rate of an inert gas included in the shielding gas.

3. The laser welding apparatus according to claim 2, wherein the gas feed rate controlling unit maintains the flow rate of the inert gas at a timing when the rate of change of the light intensity is equal to or less than a second threshold (a value smaller than zero) after the flow rate of the inert gas is increased.

4. The laser welding apparatus according to claim 1, wherein when the rate of change of the light intensity is equal to or less than a third threshold (a value smaller than zero), the gas feed rate controlling unit increases a flow rate of an oxygen gas included in the shielding gas.

5. The laser welding apparatus according to claim 4, wherein the gas feed rate controlling unit maintains the flow rate of the oxygen gas at a timing when the rate of change of the light intensity is equal to or more than a fourth threshold (a value greater than zero) after the flow rate of the oxygen gas is increased.

6. A laser welding method that performs welding by irradiating a laser beam onto a welded part while supplying a shielding gas to the welded part, the laser welding method comprising:
   measuring a light intensity of plasma light emitted from the welded part;
   calculating a rate of change of the measured light intensity; and
   controlling, according to the calculated rate of change of the light intensity, a flow rate of the shielding gas supplied to the welded part.

* * * * *